L. W. FILLEBROWN, Jr.

SPRING-SEAT.

No. 7,200. Reissued July 4, 1876.

Witnesses;
Grenvill Lewis
M. Chmel

Inventor
Luther W. Fillebrown Jr.
By Hill, Ellsworth & Spear
His Attys.

UNITED STATES PATENT OFFICE.

LUTHER W. FILLEBROWN, JR., OF WAYNE, MAINE, ASSIGNOR TO HENRY B. COBB.

IMPROVEMENT IN SPRING-SEATS.

Specification forming part of Letters Patent No. 56,200, dated July 10, 1866; reissue No. 7,200, dated July 4, 1876; application filed June 17, 1876.

*To all whom it may concern:*

Be it known that I, LUTHER W. FILLEBROWN, Jr., of Wayne, in the county of Kennebec and State of Maine, have invented certain new and useful Improvements in Spring Seats or Cushions; and I do hereby declare the following to be a full, clear, and exact description of the same, reference being had to the accompanying drawings, forming part of this specification, in which—

Figure 1:
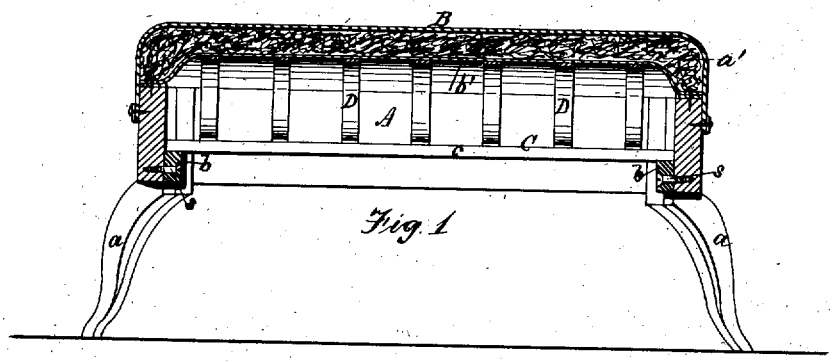
Figure 2:
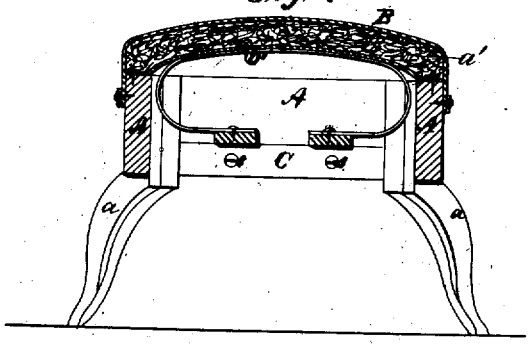
Figure 3:
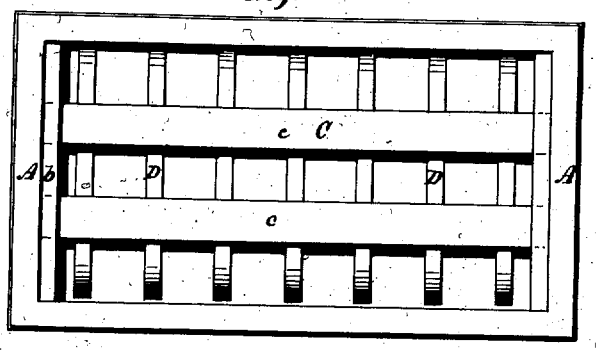

Figure 1 is a longitudinal section of a spring-seat, showing the application of my improvements. Fig. 2 is a transverse section of the same, and Fig. 3 is a bottom plan view.

Similar letters of reference in the accompanying drawings denote the same parts.

The object of my invention is to simplify and improve the construction of spring seats or cushions; and also to improve the construction of the springs themselves, as connected with means for supporting them in position preparatory to their application to the seat-frame.

To these ends the invention consists, first, in a spring-seat or spring-cushion having its springs adapted for application and removal, through the seat-frame, from the under side of the covering or upholstering, for the purpose of facilitating the construction of the seat or cushion, and preventing the covering or upholstering from being disturbed or injured when it becomes necessary to repair, change, or otherwise manipulate the springs or their connections. It further consists in a series of springs secured transversely, in the general form of an ellipse, to a wooden or other support, for the purpose of increasing the elasticity of the seat or cushion when the support is applied to the seat-frame, and for the further purpose of shaping the top of the seat. It further consists in limiting the expansion of the springs by means of the covering or upholstering independently of the seat-frame, so that the springs shall expand as the covering or upholstering yields, and thereby preserve its smoothness and tension. It further consists in adapting the springs for vertical adjustment against the under side of the covering or upholstering, so that the cushion or elastic seat can be easily set up when the springs have become sagged or depressed.

In the accompanying drawings, which show one method of carrying my invention into practice, A is the seat-frame, consisting of a rectangular or other proper shaped frame, made of wood or other suitable material, and provided with legs *a a a a*, if necessary. To this frame the edges of the covering B of the cushion should be fastened by tacks or other suitable equivalents. Beneath the said covering there may be a stuffing, *a'*, of hair or other elastic material, which may rest on a layer, *b'*, of cloth. This layer *b'* I designate as the covering proper, because it covers the springs and receives their action directly; but when it is used with a superincumbent cushion or stuffed padded surface I designate the whole by the general term "upholstering." On a frame, C, composed of two slats, *c c*, and two bars, *b b*, of wood, arranged as represented, I place a series of metallic—preferably steel—springs, D D, each of such springs being fastened, at or near its ends, to the slats *c c*, transversely thereof. The springs, when attached to their support, are each in the general form of an ellipse, with the requisite space intervening between their upper surfaces or bows, which press against the covering *b'* to form the seat and preserve its contour. The combination of the frame C and series of springs is to be placed within the frame A, with the springs upward and against the under side of the layer *b'* of cloth, and is to be firmly forced upward against such layer, after which the two end bars *b b* of the frame should be secured to the end bars of the frame A by screws S S. In this way a cushion or elastic seat can be constructed of great utility and value, and capable of being easily rounded or set up in case of any sagging of its springs, as, after such may have taken place, it will only be necessary to remove the screws S S and press the frame C still higher up into the frame A, so as to again tighten the covering and cushion on the springs. After the accomplishment of this the two frames may be fastened together as before, the screws going into fresh or other holes made in the frame A.

By applying the springs in this manner through the bottom of the frame the covering or upholstering is not disturbed or injured—that is to say, need not be detached from the frame at any point—and it is evident that they may also be removed through the bottom of the frame with similar effect when, for any reason, it becomes necessary or desirable, as, for example, in repairing or changing one or more of the springs. The springs, formed as represented, operate to crown the seat, as well as impart to it elasticity. In this respect each performs a function not common to an ordinary spiral spring.

I claim as my invention—

1. A spring seat or cushion having its springs adapted for application to and removal from the seat or cushion frame without disturbing the covering or upholstering.

2. The springs of a seat or cushion adapted for application to and removal from the seat or cushion frame, through the bottom of the latter, without disturbing the covering or upholstering.

3. A series of springs for spring seats or cushions, each spring having the general form of an ellipse, mounted transversely upon a wooden or other support, which is adapted for application to the seat or cushion frame, for the purposes specified.

4. The combination of a series of springs having the general form of an ellipse, with the frame of a seat or cushion and the covering or upholstering, for the purposes specified.

5. In a covered or upholstered spring seat or cushion, limiting the expansion of the springs by means of the covering or upholstering, independently of the seat or cushion frame, for the purpose specified.

6. A spring seat or cushion, having its springs adapted for vertical adjustment within the seat or cushion frame, for the purpose of taking up the slack of the covering or upholstering when the springs have become sagged.

LUTHER W. FILLEBROWN, JR.

In presence of—

C. A. WING,

FRANK I. BISHOP.